Oct. 24, 1939.    W. G. BIHLER    2,177,131
PIERCING MACHINE OR THE LIKE
Filed July 28, 1936    2 Sheets-Sheet 2
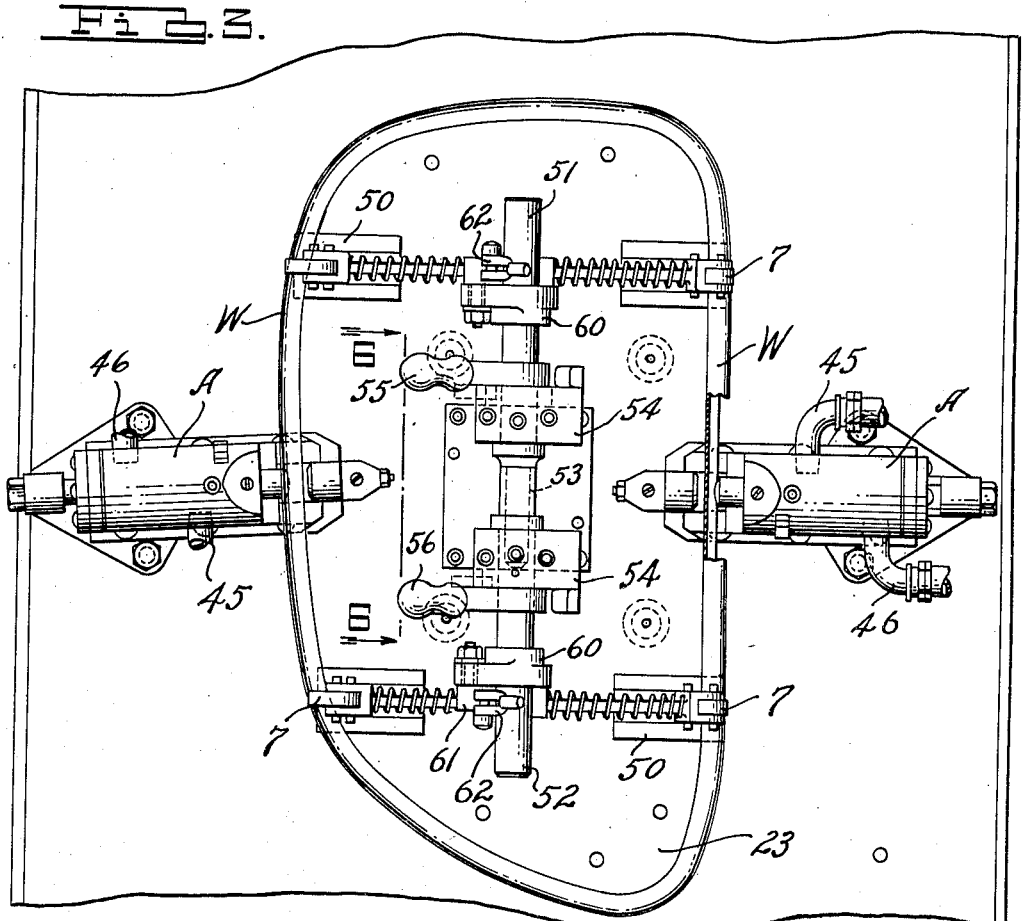
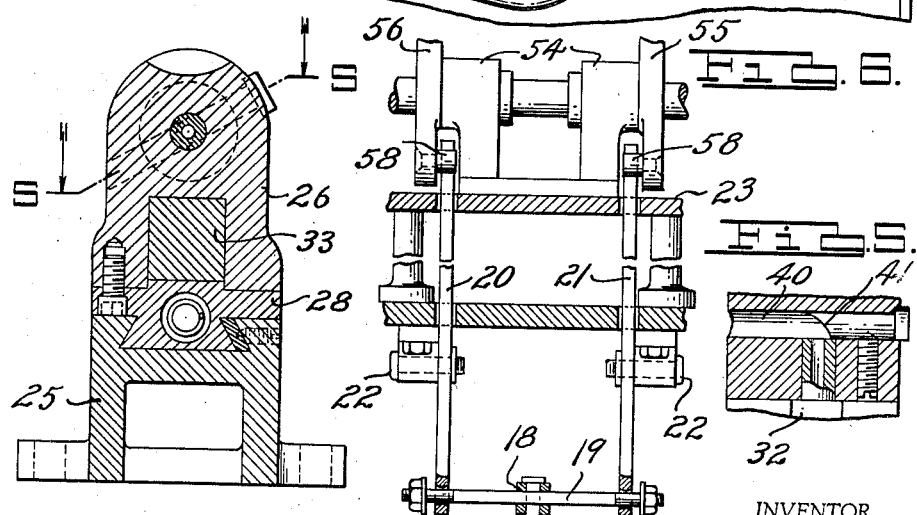
INVENTOR.
Walter G. Bihler
BY
Barnes, Kisselle, Laughlin & Raisch
ATTORNEY.

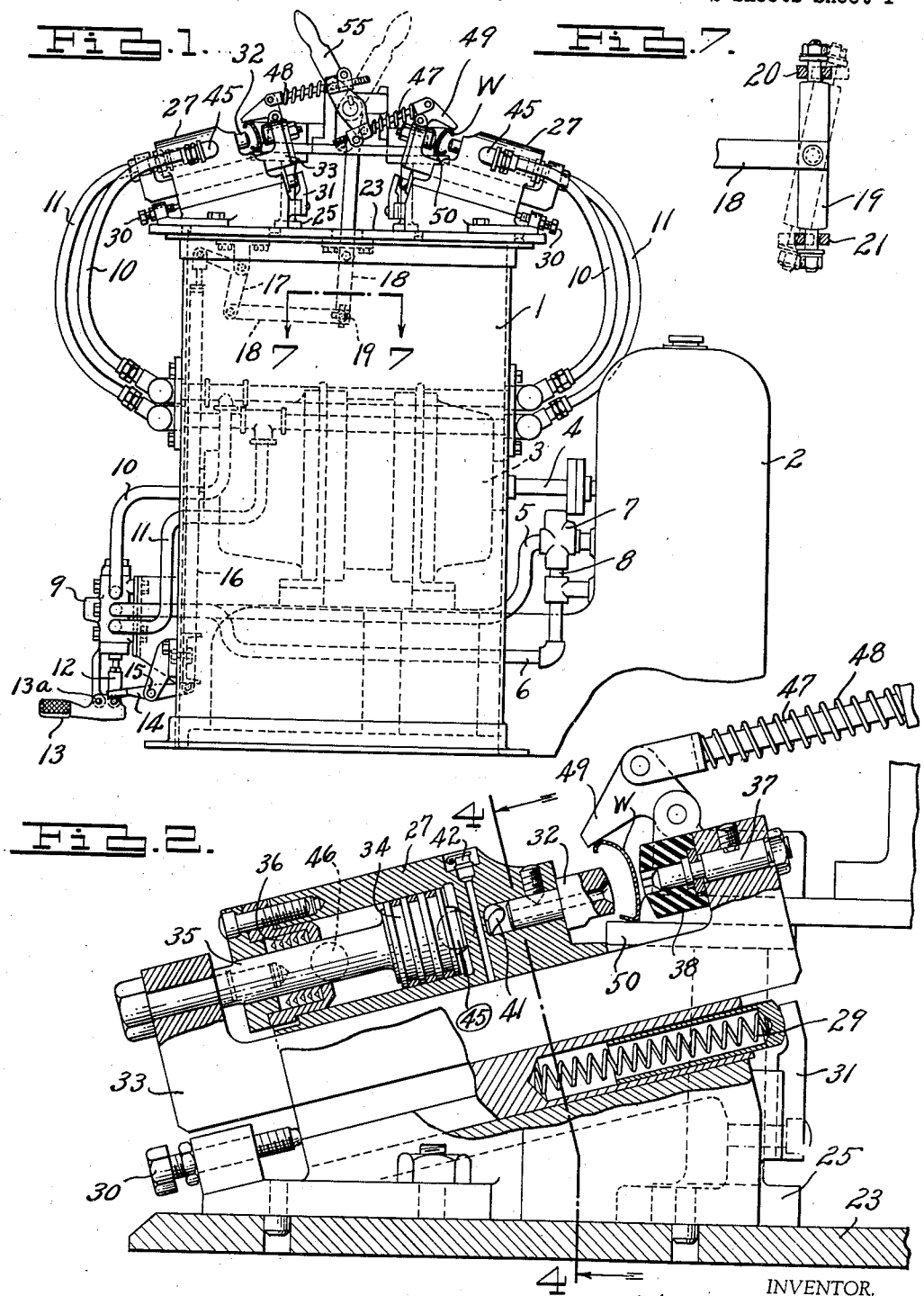

Patented Oct. 24, 1939

2,177,131

UNITED STATES PATENT OFFICE 2,177,131

PIERCING MACHINE OR THE LIKE

Walter G. Bihler, Detroit, Mich., assignor to Ternstedt Manufacturing Company, Detroit, Mich., a corporation of Michigan Application July 28, 1936, Serial No. 92,986

4 Claims. (Cl. 192—131)

This invention relates to a machine for acting upon work, usually in the form of sheet metal, for piercing or punching the same or for otherwise shaping the work.

The particular form of the machine shown herein as an embodiment of the invention, is a machine for piercing or punching sheet metal work to form apertures therein.

Among the objects of the invention is the provision of a machine for punching or performing work on sheet metal parts which may be of irregular shape, and wherein a plurality of operations may be performed simultaneously on the work and at spaced points. In some classes of work the sheet metal to be acted upon may be relatively thin and subject to easy distortion or deformation, which is particularly undesirable where the sheet metal acted upon is to become a finished piece which is exposed to view in any sort of a structure and which should be, at least, somewhat of an ornamental nature. Such work, for example, may be a so-called garnish molding which extends around the window opening of an automobile body on the inside. Such moldings may be attached to the body by screws or other fastening devices passing through apertures, and since a garnish molding is more or less of an ornamental nature the aperture should be nicely formed and the metal should not otherwise be deformed or distorted. The machine shown is one for punching out garnish molding although the invention is not limited to acting upon such work.

It is a further object of the invention to provide a machine wherein the pressures on the work, especially on opposite sides thereof, are balanced one against each other so that the work is not strained or so there is no tendency to distort or deform the same; a still further object is to provide a machine which has certain safety characteristics for the protection of the operator to the end that the operator's hands cannot be caught in the machine while it is operating; another object is to provide a machine of a flexible nature in that it may be varied to accommodate work of different shapes, as for example, garnish moldings take on different contours depending upon variations in the design of automobile bodies and the shape of the windows.

In the accompanying drawings:

Fig. 1 is a side elevational view of a machine constructed in accordance with the invention illustrating some of the hidden parts in dotted lines.

Fig. 2 is an enlarged cross-sectional view taken through one of the piercing units.

Fig. 3 is a top view illustrating the arrangement of the parts in a machine for acting upon a garnish molding.

Fig. 4 is a cross-sectional view taken substantially on line 4—4 of Fig. 2.

Fig. 5 is a cross-sectional view taken substantially on line 5—5 of Fig. 4.

Fig. 6 is a detail view, partly in section, looking substantially on line 6—6 of Fig. 3.

Fig. 7 is a detail view looking substantially on line 7—7 of Fig. 1.

The machine shown in Fig. 1 has a frame or body 1 for supporting the operating mechanism, and the mechanism as shown is hydraulically operated. For this purpose a suitable hydraulic pumping mechanism may be housed in a chamber 2 driven by a motor 3 having a drive shaft 4. Such hydraulic mechanism is well known to those versed in the art but it will be briefly described as follows: The fluid, which may be an oil, is pumped out through a line 5 and returns through a line 6, and in the line 5 is a pressure valve 7 arranged so that when a certain pressure exists the fluid flows through pipe line 8 into the return line. The lines 5 and 6 connect into a valve housing 9 and leading from the valve housing are two pipe or tube lines 10 and 11. These tube lines may be constituted in part by piping, as shown, and by flexible conduits, as shown, the same reference characters being applied to a given tube line regardless of the form. These tube lines run to the piercing units, as will be presently described. A control member 12 is included in the valve which is shiftable vertically as Fig. 1 is viewed, and this control member is to be operated or controlled by two agencies, in turn actuated by an operator. One agency takes the form of a treadle or foot pedal 13, which when depressed urges the valve member 12 upwardly. Another takes the form of a lever 14 which may rest upon the connection between the pedal and the control member and fulcrumed as at 15. This lever is to be controlled by the hands of the operator; for this purpose a rod 16 extends upwardly and connects to a bell crank 17, which in turn is connected to a link 18. This link pivotally connects to the intermediate portion of a cross bar in the nature of a whiffletree 19 (Figs. 6 and 7). Two levers 20 and 21 are pivoted to the frame and each arm is connected to an end of the cross bar so that there is some rocking movement permitted. These arms are pivoted as at 22 and their upper ends project upwardly and above a sort of work-table 23 (Fig. 6). The manner of operation will be presently brought out.

The work-table 23 is carried above the body 1 a suitable distance and grouped around this work-table in suitable numbers are hydraulic piercing units. In Fig. 3 two of such units are shown positioned substantially opposite each other, although it will be appreciated that any suitable number of units may be grouped around the work depending upon the number of piercing operations to be performed. The work, which in this case is a garnish molding, is illustrated at W and it will be noted that the work is in the form of a substantially closed area, although, of course, the machine may be used on work of other shapes. The piercing units are generally indicated at A.

Each piercing unit (Figs. 2 and 4) comprises a base 25 which may be mounted upon the body 1. Slidably mounted on the base is a member 26 which has a cylinder formation 27. The slidable connection may be provided through the means of a member 28 attached to the body 26 and having a dovetailed slidable mounting on the base 25. A coil spring 29 may be situated in a bore in the member 28 for holding the cylinder member against a stop 30, the spring reacting against a bracket 31 secured to the base. The cylinder member carries a work-performing element shown herein as a die 32.

Another member 33 of U-shape is slidably mounted between the cylinder member 26 and the slide member 28 and one end carries a piston 34 through the means of a piston rod 35 which fits in the cylinder and which extends through a packing gland 36. The opposite end of the U-shaped member 33 carries a punch 37 and the punch may be associated with a stripper 38 in the form of a rubber block, as shown.

Accordingly, it will be noted that the cylinder member carrying the die, and the U-shaped member carrying the punch are reciprocable relative to each other and relative to the base, it being understood that the punch and die are in alignment with each other. The punch is hollow so that pieces removed from the work may pass therethrough and be guided out through a passageway 40 in the body of the cylinder member, for which purpose a guiding plug 41 may be used (Fig. 5). The spring 29 normally holds the cylinder member in a direction away from the punch and against the stop 30. The sliding surfaces may be lubricated through means of a suitable oil cup 42.

The pipe line 10 or the branches thereof connect into the cylinders as at 45. The pipe line 11 or its branches thereof connect into the cylinders as at 46, the connections being at axially spaced points, as indicated.

The work is to be placed into position so that it lies between the several punches and dies. For this purpose there are a plurality of supports 50 which support the work in position, as illustrated in Fig. 2.

Clamping means for holding the work is provided and this takes the form of a pivoted clamping member 49, one for each support. Pivotally connected to each clamping member is a rod 47 with a compression spring 48 surrounding the same. Pivotally mounted upon the table 23 are two shafts 51 and 52; one end of one shaft may be journaled in the other shaft as at 53, the shafts being mounted in a suitable bearing structure 54.

An operating handle is attached to each shaft, one handle being shown at 55 and the other at 56. These handles, which are in the nature of levers have lower ends extending downwardly as shown in Fig. 6, and each is provided with a part which may be in the form of a pin 58 for engagement with the levers 20 and 21.

A member 60 is carried by each shaft and each has oppositely extending arms. The arms of each member carries a projecting piece 61 through which one of the rods 47 slidably extends. Two clamping units are disposed opposite one member 60 and two clamping units are disposed opposite the other member 60, and the rods 47 incline upwardly and downwardly into cooperating relation with the members 60. A stop member in the form of a clamp 62 may be fastened to each rod 47. The members 60 are keyed or otherwise non-rotatably fixed to the shafts 51 and 52.

In the operation of the machine it will be understood that the punch and die members are normally separated, or in other words, that the work-performing units are open, as shown in Fig. 2. The control levers 55 and 56 are substantially in the dotted line position shown in Fig. 1, in which position the clamping members 49 are in position to let the work be located. The operator now locates the work. The levers 55 and 56 are now grasped, one in each hand, and rocked counterclockwise as Fig. 1 is viewed. The brackets 60 rock and serve to compress the springs 48, thus rocking the clamping pieces 49 to clamp the work, as illustrated in Fig. 2. It might be said here that when the levers are rocked in reverse direction, the members 61 abut against the members 62, thus pulling on the rods 47 to open the clamping members, in which action the clamping member, as shown in Fig. 2, swings clockwise. The position of the parts shown in Fig. 1 is such that the levers are ready for the final counterclockwise movement to compress the clamping springs and actuate the control valve as will presently be seen.

The valve 9 is a hydraulic valve available on the market, and, therefore, its details are not shown inasmuch as such a valve structure is well known to those versed in the art. This valve has three positions, to-wit: a normal intermediate position, an open position on one side thereof and another open position on the other. Normally, the valve in its intermediate position, as shown in Fig. 1, connects the lines 5 and 6 so that the oil is pumped through line 5 through the valve and back through the line 6. Now as the control levers 55 are swung counterclockwise the two levers rock the arms 20 and 21, and these arms through the cross bar 19 push upon the member 18, rock the bell crank 17 and through the rod 16 rock the control lever 14 in a counterclockwise direction around its fulcrum. This pulls the valve member 12 downwardly, in which action the pedal 13 may rock around its fulcrum 13—a. It will be noted that the operator must have both hands on the levers. If only one lever is rocked the bar 19 rocks, as indicated by the dotted lines of Fig. 7, and the valve is not operated and the machine is not set into motion. Again, note that the valve member 12 must be pulled downwardly to start the machine into operation, and this cannot be done by the foot pedal.

When the two control handles are rocked, as described, either simultaneously or one after the other, the valve member 12 is pulled down, and this opens the line 5 into line 10 and line 11 and the return line 6. Oil under pressure now flows through the line 10 and it branches and enters each cylinder at 45. The cylinder and piston of each unit is then shifted with the piston moving to the left (Fig. 2) and the cylinder to the right. The pressure on the work will be balanced because the pressure is necessarily applied equally on opposite sides of the work. As a result, the work is not distorted. The punch and die come together to act upon the work. At the end of this movement the resistance to the flow of the oil materially increases or the flow of oil through the lines 10 may be substantially stopped. At this time the relief valve 7 permits the oil to flow back into the return pipe 6, with the result that the oil pumping mechanism continues to operate. Should the operator now release the levers 55 and 56, the work is no longer held clamped in position but the punch and dies are clamped against the work. The operator now depresses the pedal 13 to raise the valve member 12 and this connects line 11 with line 5 so that the oil pressure enters the cylinders at 46, thus opening the punch and dies and restoring the parts to the position shown in Fig. 2. It will be appreciated that when lines 5 and 10 are connected for the flow of oil through lines 10 to the cylinders that lines 11 and 6 are connected so that the oil may return to the opposite side of the piston, or conversely, when line 11 is connected to line 5, lines 10 and 6 are connected so that oil may flow back through the ports 45 to the return line. When the work-performing devices have opened up, as shown in Fig. 2, the operator merely takes his foot off of the pedal 13 and the valve comes back to its normal intermediate position; then lines 10 and 11 are then cut off and lines 5 and 6 connected through the valve.

Due to the use of springs 48 the work can be clamped only with what pressure is afforded by the springs, so that the work is not distorted or deformed. Moreover, the machine is flexible in that the units A can be located at various points on the support 1 and the clamping devices may, if necessary, be shifted on the table 23. If an operator turns only one of the levers the machine is not set into operation because this merely swings the pivoted bar 19. Power must be applied subtantially equally to both levers in order to open the hydraulic valve for machine operation.

I claim:

1. An apparatus for performing operations on work pieces comprising, means for supporting a work piece, two clamping devices for clamping the work piece in its supported position, two operator-controlled independently movable control devices, means operably and independently connecting each control device to one of the clamping devices, one or more power operated operation-performing units positioned to function upon the work in its supported position, a control element movable for governing the operation-performing units, and a rocker arm connected respectively to the two controlling devices and the governing element arranged to shift the governing element for machine operation upon movement of both control devices, but which rocks upon movement of only one of the control devices whereby movement of one control device is ineffective for shifting the control element.

2. In an apparatus substantially for the purpose described, a unit for performing an operation on a work piece, power means for actuating the unit, a movable member for rendering the power means effective, a pair of control levers one for each hand of an operator, a clamping device connected to each lever and operable to clamp the work piece upon movement of the lever connected thereto, and means operably associating the levers with the movable member including a pivotally mounted cross bar with opposite ends thereof operatively associated with one of the levers whereby movement of one lever effects rocking of the cross bar and is ineffective to actuate the movable member, and whereby both levers must be actuated to act upon the movable member through the pivoted cross bar.

3. An apparatus for performing operations on a work piece of such shape that the work piece has spaced and substantially opposite portions, means for supporting the opposite portions of the work piece, a pair of pivotally mounted levers, one for each hand of the operator and located between the said opposite portions of the work piece, clamping means applicable to different portions of the work piece, means including a yieldable element connecting each lever to a clamping means, whereby movement of a lever operates the clamping means connected thereto, a plurality of power operated units each for performing an operation on the work piece, a control element movable for governing the power operation of said units, a rocker arm connected respectively to the two levers and to the governing element and arranged to shift the governing element for operation of the units upon movement of both levers, which rocker arm rocks upon movement of only one of the levers, whereby movement of both levers is required for operation of the units.

4. An apparatus for performing operations on a work piece, which work piece comprises a metal strip fashioned into such shape as to define substantially a closed area, a table or the like, means on the table for supporting the work piece, a pair of levers, one for each hand of the operator, means on the table and located within the area defined by the work piece for pivotally mounting the levers with the levers disposed within said area, clamping means applicable to different portions of the work piece, means including a yieldable element connecting each lever to a clamping means, whereby movement of a lever operates the clamping means connected thereto, a plurality of power operated units each for performing an operation on the work piece, a control element movable for governing the power operation of said units, a rocker arm connected respectively to the two levers and to the governing element and arranged to shift the governing element for operation of the units upon movement of both levers, which rocker arm rocks upon movement of only one of the levers, whereby movement of both levers is required for operation of the units.

WALTER G. BIHLER.